United States Patent
Adams

(10) Patent No.: US 9,785,787 B2
(45) Date of Patent: Oct. 10, 2017

(54) ENCRYPTING IMAGES ON A CLIENT DEVICE FOR SECURE TRANSMISSION AND STORAGE ON A STORAGE DEVICE

(71) Applicant: Juniper Networks, Inc., Sunnyvale, CA (US)

(72) Inventor: Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 448 days.

(21) Appl. No.: 14/042,139

(22) Filed: Sep. 30, 2013

(65) Prior Publication Data

US 2015/0095643 A1    Apr. 2, 2015

(51) Int. Cl.
*G06F 21/62* (2013.01)
*H04N 1/44* (2006.01)

(52) U.S. Cl.
CPC ....... *G06F 21/6218* (2013.01); *H04N 1/4486* (2013.01)

(58) Field of Classification Search
CPC . G06F 21/6218; G06F 15/16; H04L 63/1416; H04L 9/00
See application file for complete search history.

(56) References Cited

U.S. PATENT DOCUMENTS 6,266,680 B1 *   7/2001   Song ................. H04L 9/3236
                                                                 715/205
7,379,551 B2     5/2008   Chan et al.
7,805,608 B2 *   9/2010   Chow ................. H04L 63/0428
                                                                 380/277
8,499,099 B1 *   7/2013   Kogan ............. G06F 17/30887
                                                                 709/245
9,185,081 B2 *  11/2015   Allen ................. H04L 63/0428
2005/0223216 A1* 10/2005  Chan .................... H04L 63/083
                                                                 713/153

(Continued)

FOREIGN PATENT DOCUMENTS

CN    1697367 A    11/2005
EP    1 968 302      9/2008

(Continued)

OTHER PUBLICATIONS

O'Reilly Media, Inc., "Encryption of Graphics Files", http://www.fileformat.info/mirro/egff/ch08_05.htm, Feb. 1, 2001, 6 pages.

(Continued)

*Primary Examiner* — Brandon Hoffman
*Assistant Examiner* — Wasika Nipa
(74) *Attorney, Agent, or Firm* — Harrity & Harrity, LLP

(57) ABSTRACT

A device may identify an image to be encrypted, and may convert the image to a first string in a first format. The first string may represent the image. The device may receive information that identifies a key for encrypting the first string, and may generate a first encrypted string by encrypting the first string using the key. The device may convert the first encrypted string, in the first format, to a second encrypted string in a second format. The device may provide the second encrypted string to a storage device without providing the key or the image to the storage device. The storage device may be unable to recover the image using the second encrypted string.

20 Claims, 12 Drawing Sheets

(56) References Cited

U.S. PATENT DOCUMENTS

2008/0123861 A1 5/2008 Chow
2011/0222687 A1* 9/2011 Mori .................... H04N 7/1675
380/200

FOREIGN PATENT DOCUMENTS

JP    2008-003883 A    1/2008
WO   WO 2009/056897   5/2009

OTHER PUBLICATIONS

Wikipedia, "Base64", http://en.wikipedia.org/wiki/Base64, Aug. 16, 2013, 10 pages.
European Search Report corresponding to EP 14 18 6514, mailed Mar. 25, 2015, 6 pages.

* cited by examiner

ENCRYPTING IMAGES ON A CLIENT DEVICE FOR SECURE TRANSMISSION AND STORAGE ON A STORAGE DEVICE

BACKGROUND

A user may upload images and other files from the user's device to a storage device, such as a server. The server may store the images and/or files for later downloading by the user, for sharing with other users, or the like.

SUMMARY

According to some possible implementations, a method may include: identifying, by a device, an image to be encrypted; converting, by the device, the image to a first string in a first format, where the first string represents the image; receiving, by the device, information that identifies a key for encrypting the first string; generating, by the device, a first encrypted string by encrypting the first string using the key; converting, by the device, the first encrypted string, in the first format, to a second encrypted string in a second format; and providing, by the device, the second encrypted string to a storage device without providing the key or the image to the storage device, where the storage device is unable to recover the image using the second encrypted string.

According to some possible implementations, a computer-readable medium may store one or more instructions that, when executed by one or more processors, cause the one or more processors to: receive encrypted text information from a storage device, where the encrypted text information is associated with an image; convert the encrypted text information into encrypted binary information; determine a key to be used to decrypt the encrypted binary information, where the key is inaccessible to the storage device; decrypt the encrypted binary information using the key to determine decrypted binary information; encode the decrypted binary information into a string of characters; parse the string of characters; generate the image based on parsing the string of characters; and provide the generated image.

According to some possible implementations, a device may include one or more processors configured to: receive information identifying a file; convert the file to a binary representation of the file; generate an encrypted textual representation of the file, using a key, based on the binary representation of the file; provide the encrypted textual representation of the file to a storage device without providing the key or the file to the storage device; request the encrypted textual representation of the file from the storage device; receive the encrypted textual representation of the file from the storage device based on requesting the encrypted textual representation of the file; and generate the file based on receiving the encrypted textual representation of the file from the storage device and further based on the key, where the key is inaccessible by the storage device.

DETAILED DESCRIPTION

The following detailed description of example implementations refers to the accompanying drawings. The same reference numbers in different drawings may identify the same or similar elements.

A user may upload images and other files from a client device to a storage device, such as a server. The storage device may store the images and/or files for storage, for later downloading by the user, for sharing with other users, or the like. The user may not wish for a person with access to the storage device, such as an administrator, an operator, a government official, etc., to have access to the contents of the images or other files uploaded to the storage device. However, such a person may be able to view the contents of uploaded files if the files are not encrypted, or if the files are encrypted but the encryption key is accessible by the storage device. Implementations described herein prevent a person, other than a user with an appropriate password or key, from accessing the contents of files uploaded by the user to a storage device.

Figure 1A:
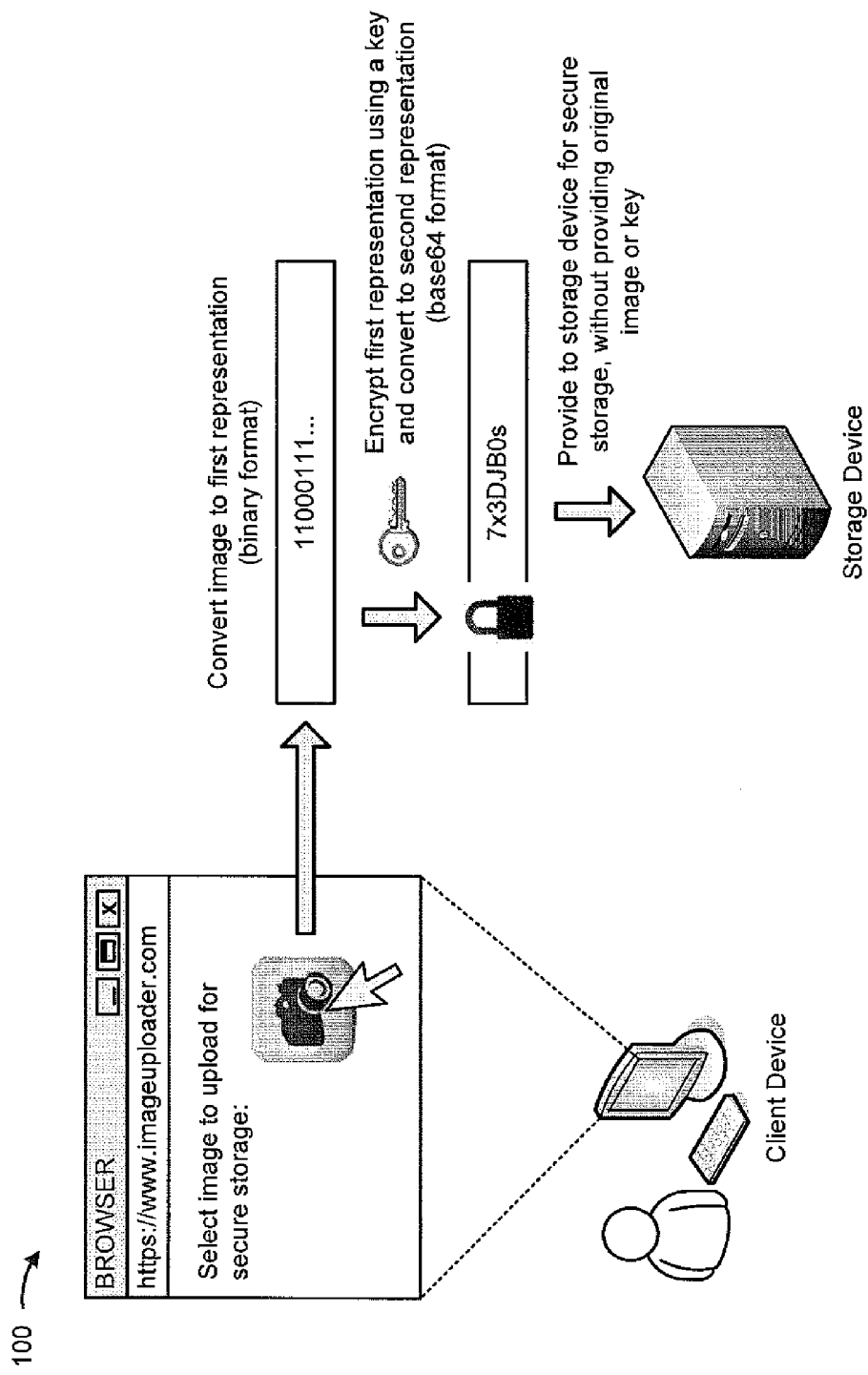
FIGS. 1A-1C are diagrams of an overview of an example implementation described herein.
Figure 1B:
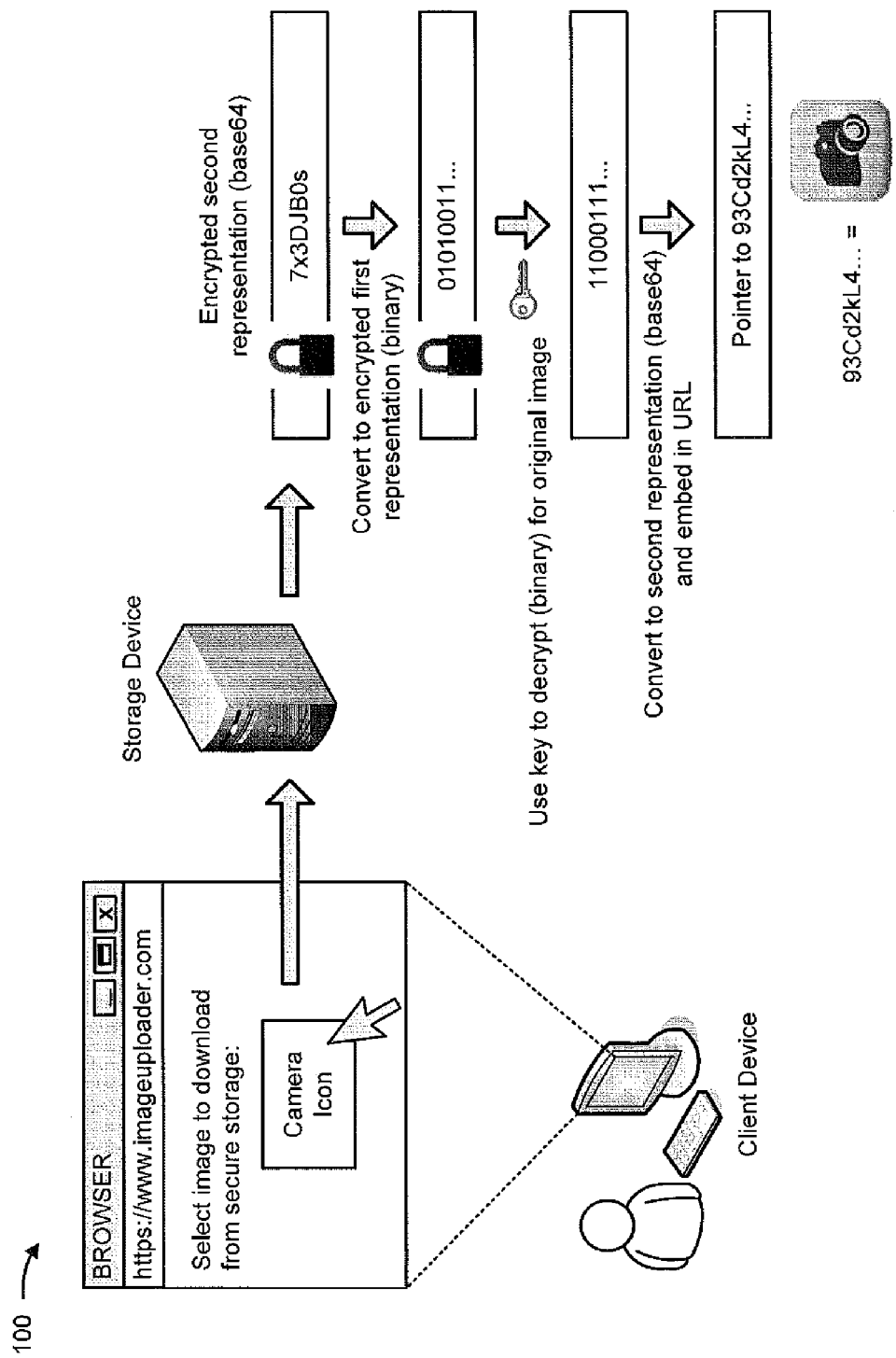
Figure 1C:
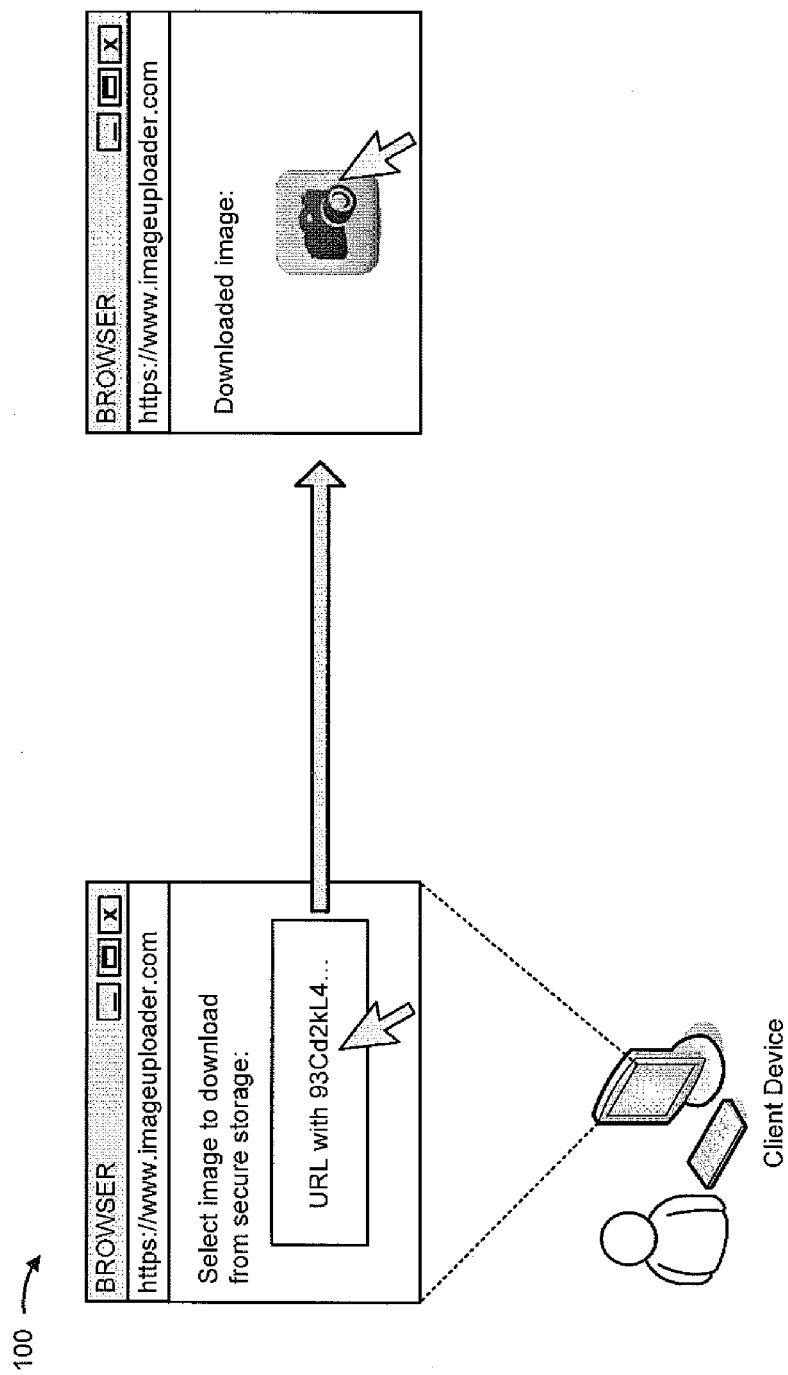

FIGS. 1A-1C are diagrams of an overview of an example implementation 100 described herein. As shown in FIG. 1A, a user may interact with a browser on a client device (e.g., a personal computer) to select an image from the client device to be uploaded to a storage device. The client device (e.g., the browser) may determine a first representation of the image, such as by reading the image in binary format using a script (e.g., javascript). The client device may encrypt the first representation of the image using a key, such as a key supplied by the user or determined based on login information associated with the user. The client device may convert the first encrypted representation into a second encrypted representation, such as by converting from the binary format to a base64 format. As shown, the client device may provide the second encrypted representation (e.g., in base64 format) to the storage device for storage. The client device may prevent the original image and the key from being transmitted to the storage device, so that a person with access to the storage device may not view the contents of the image (e.g., may not view the image itself).

As shown in FIG. 1B, at a later time, the user (or another user with whom the user has shared the key) may wish to retrieve the uploaded image. The client device may retrieve the second encrypted representation (e.g., in base64 format) from the storage device, and may convert the second encrypted representation to the first encrypted representation (e.g., in binary format). The client device may use the key to decrypt the first encrypted representation into a first decrypted representation of the image (e.g., in binary format). This first decrypted representation may be, for example, the same as the binary representation of the image that was originally read by the client device (e.g., using javascript).

To render the image in the browser, the client device may convert the first decrypted representation (e.g., in binary format) to a second decrypted representation (e.g., in base64 format), and may embed the second decrypted representation in a pointer (e.g., a uniform resource identifier (URI), a uniform resource locator (URL), etc.) that points to the second decrypted representation (e.g., a base64 textual representation of the image). As shown in FIG. 1C, the client device (e.g., via the browser) may use the pointer with the embedded base64 representation of the image to render the image by converting the base64 representation of the image to the original image. In this way, a user may securely store images or other files on a remote storage device without providing the images/files or a key for decrypting the images/files to the storage device, thus decreasing the risk that a third party may access the contents of the images/files. Furthermore, the user does not need to download any additional encryption software to securely store the files. Rather, the encryption may be performed by a browser executing a script. Additionally, the user may be able to view the code used to store the images by the storage device, such that the user can verify that the code is not providing decryption information to the storage device.

Figure 2:
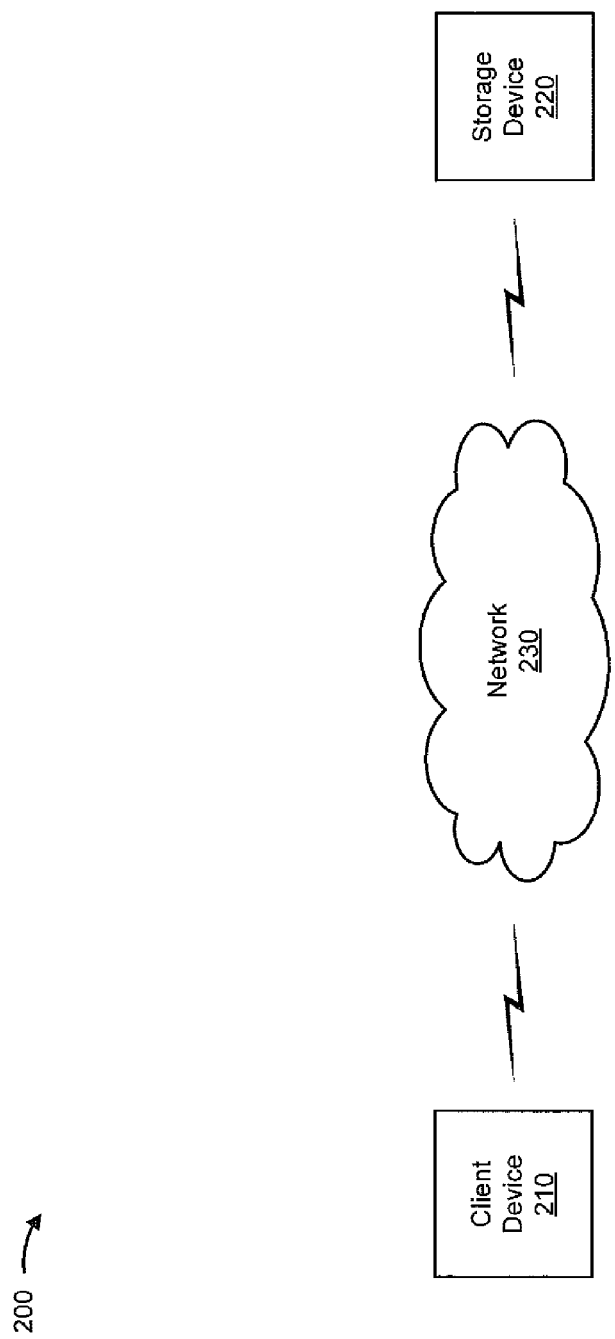
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a storage device 220, and a network 230. Devices of environment 200 may interconnect via wired connections, wireless connections, or a combination of wired and wireless connections.

Client device 210 may include one or more devices capable of receiving, generating, storing, processing, and/or providing information, such as a file (e.g., an image, a text document, an audio file, a video file, etc.). For example, client device 210 may include a computing device, such as a laptop computer, a tablet computer, a handheld computer, a desktop computer, a mobile phone (e.g., a smart phone, a radiotelephone, etc.), a personal digital assistant, a server, or a similar device. Client device 210 may receive information from and/or provide information to storage device 220 (e.g., via network 230). Client device 210 may include a browser used to access and/or provide web pages, and may utilize the browser to provide information to and/or retrieve information from storage device 220. The browser may include, for example, a browser capable of converting a file into binary format (e.g., using javascript, hypertext Markup Language version 5 (HTML5), etc.), encrypting and/or decrypting the file (e.g., using a key), converting between different formats and/or representations (e.g., binary, base64, base32, ASCII, etc.), reading the file (e.g., an image) using a text or data format representation of the file (e.g., a base64 representation of an image), and/or performing other operations described elsewhere herein.

Storage device 220 may include one or more devices capable of receiving, generating, storing, processing, and/or providing information, such as a file (e.g., an image, a text document, etc.). For example, storage device 220 may include a computing device, such as a server, a laptop computer, a tablet computer, a handheld computer, a desktop computer, a mobile phone (e.g., a smart phone, a radiotelephone, etc.), a personal digital assistant, or a similar device. Storage device 220 may receive information from and/or provide information to client device 210 (e.g., via network 230). In some implementations, storage device 220 may receive, store, and/or provide an encrypted file, without the ability to decrypt the file (e.g., without receiving or storing a key for decrypting the file).

Network 230 may include one or more wired and/or wireless networks. For example, network 230 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
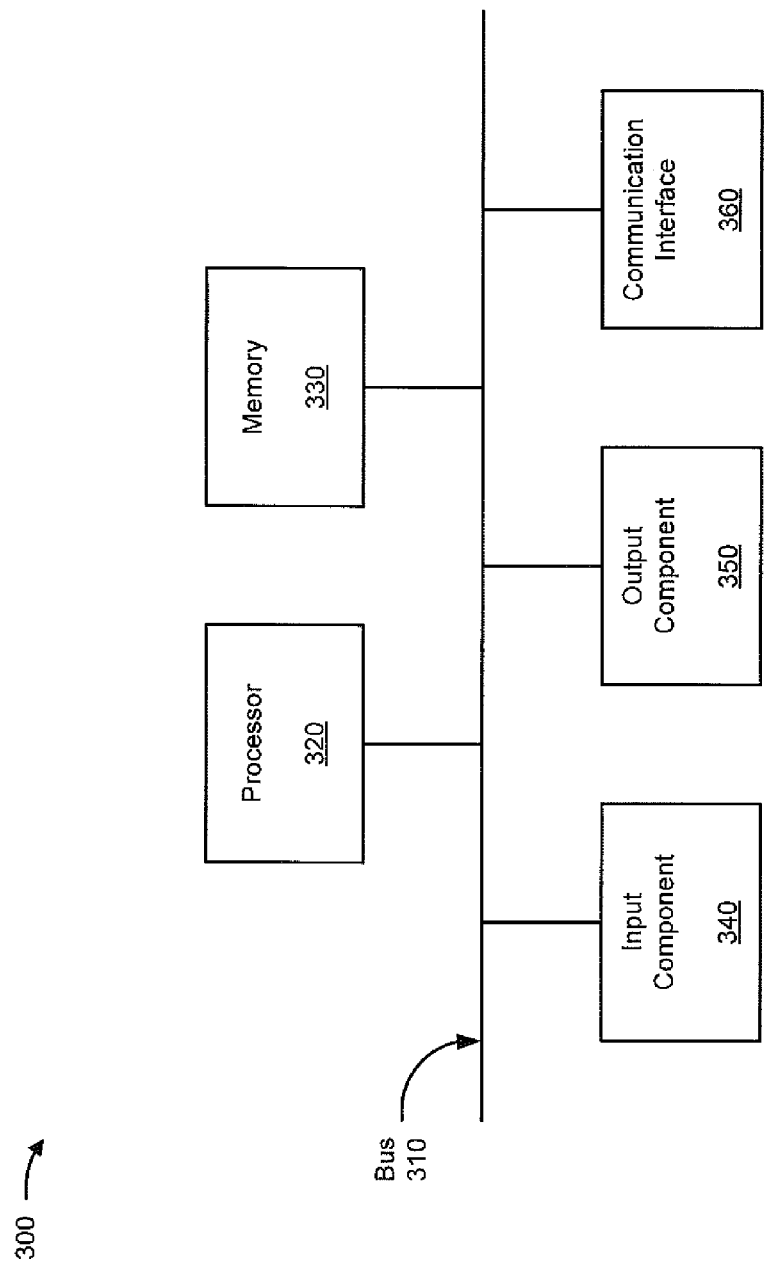
FIG. 3 is a diagram of example components of one or more devices of FIG. 2.

FIG. 3 is a diagram of example components of a device 300, which may correspond to client device 210 and/or storage device 220. In some implementations, client device 210 and/or storage device 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or a processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
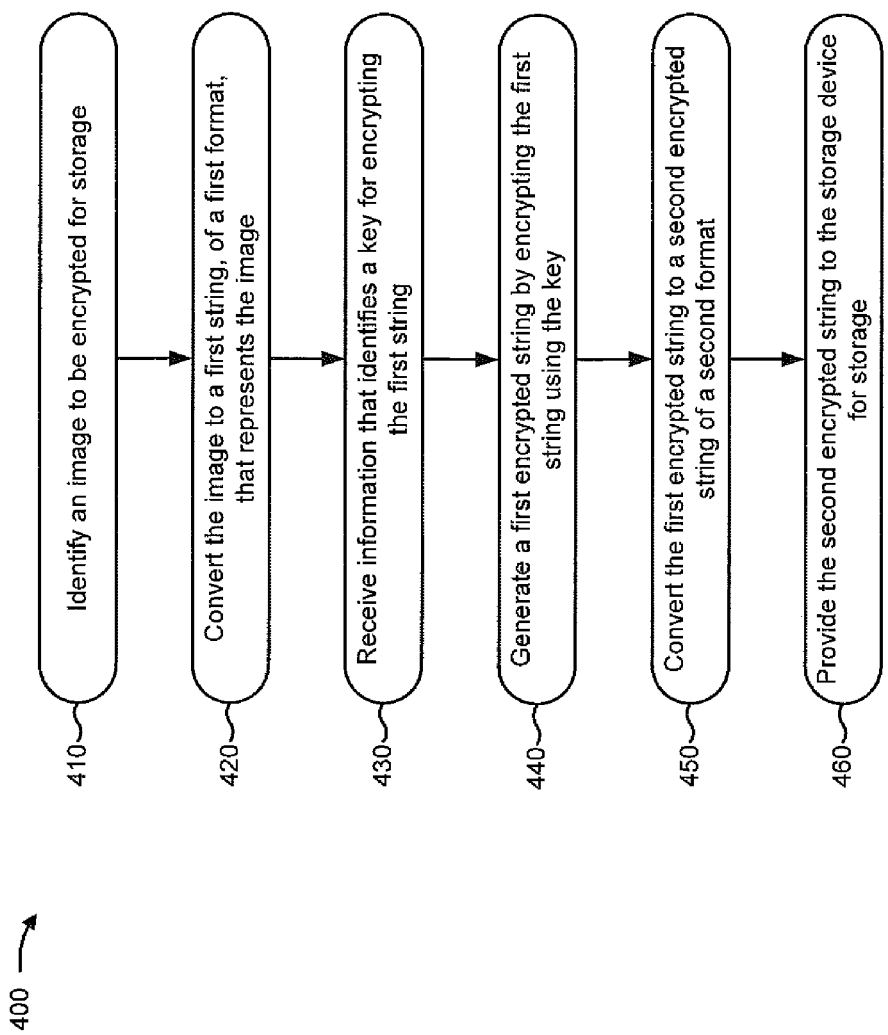
FIG. 4 is a flow chart of an example process for encrypting an image or another file on a client device for secure transmission to and storage on a storage device.

FIG. 4 is a flow chart of an example process 400 for encrypting an image or another file on a client device for secure transmission to and storage on a storage device. In some implementations, one or more process blocks of FIG. 4 may be performed by client device 210. In some implementations, one or more process blocks of FIG. 4 may be performed by another device or a group of devices separate from or including client device 210, such as storage device 220.

As shown in FIG. 4, process 400 may include identifying an image to be encrypted for storage (block 410). For example, client device 210 may identify an image to be encrypted for storage on storage device 220. Client device 210 may identify the image based on user input that identifies, for example, the image and/or a memory location at which the image is stored. For example, the user may provide input, via a browser or another application, that identifies the image (e.g., an image stored on client device 210 or an a memory accessible by client device 210) to be uploaded to storage device 220. Client device 210 may retrieve the image from a memory location associated with the image. While client device 210 is described herein in some examples as performing operations on an image, in some implementations, client device 210 may perform these operations on another file, such as a text file, an audio file, a video file, a program, an HTML file, a hybrid file that includes an image, text, audio, video, etc., or another type of file.

As further shown in FIG. 4, process 400 may include converting the image to a first string, of a first format, that represents the image (block 420). For example, client device 210 may convert the image to a first string that represents the image. The first string may be in a first format, and client device 210 may convert the image to the first format. For example, the first string may be in a binary format (e.g., a string of 1's and 0's), and may include binary data. Additionally, or alternatively, the first string may be in a text format (e.g., base32, base64, hexadecimal, ASCII, a string of characters, etc.). Client device 210 may, for example, utilize a browser executing a script (e.g., javascript) to convert the image to the first string in the first format. In some implementations, a user may specify the first format. Additionally, or alternatively, client device 210 may determine one or more formats compatible with a browser being used to upload the image (e.g., where a browser is able to convert the image into the compatible format), and may select the first format (e.g., a default format) from the one or more compatible formats. The first string may represent the image, such that client device 210 may generate the image by processing the first string (e.g., by decoding the first string to generate the image).

As further shown in FIG. 4, process 400 may include receiving information that identifies a key for encrypting the first string (block 430). For example, client device 210 may receive information identifying an encryption key for encrypting the first string. In some implementations, client device 210 may determine the key based on user input. For example, the user may input the key to client device 210 by inputting the key as a string of characters. Additionally, or alternatively, client device 210 may determine the key based on login information associated with the user (e.g., a username, a password, an account identifier, a user identifier, etc.). Client device 210 may prompt the user to input the login information, and may generate and/or determine a key associated with the user based on the login information (e.g., using an algorithm stored locally by client device 210 and not accessible to storage device 220). In some implementations, client device 210 may provide the key via a browser using a cookie (e.g., a security key provided using a security cookie). The key may be stored by client device 210, such that storage device 220 does not receive, store, or have access to the key.

As further shown in FIG. 4, process 400 may include generating a first encrypted string by encrypting the first string using the key (block 440). For example, client device 210 may encrypt the first string, using the key, to generate a first encrypted string. Client device 210 may use one or more encryption techniques, such as the secure hash algorithm (SHA) (e.g., SHA-0, SHA-1, SHA-2, SHA-3, etc.), the advanced encryption standard (AES), the RSA algorithm, the message-digest algorithm (e.g., MD5), etc., to encrypt the first string using the key. In some implementations, the first encrypted string may include a string in the same format as the first string, such as a binary format. Client device 210 may, for example, utilize a browser to encrypt the first string, such as a browser executing a script.

As further shown in FIG. 4, process 400 may include converting the first encrypted string to a second encrypted string of a second format (block 450). For example, client device 210 may convert the first encrypted string from the first format to a second (e.g., different) format to generate a second encrypted string. In some implementations, client device 210 may convert the first encrypted string from a binary format to a second encrypted string in a base64 format. In some implementations, the first format and/or the second format may include other formats (e.g., text formats), such as a base32 format, a hexadecimal format, an ASCII format, or the like. Client device 210 may convert the first encrypted string to the second encrypted string by encoding the first encrypted string using a binary-to-text encoding technique.

In some implementations, a user may specify the second format by providing input identifying the second format to client device 210. Additionally, or alternatively, client device 210 may determine one or more formats compatible with a browser being used to upload the image (e.g., where a browser is able to convert from the first format to the compatible format), and may select the second format (e.g., a default format) from the one or more compatible formats. Additionally, or alternatively, client device 210 may determine one or more formats compatible with storage device 220 being used to store the image (e.g., a format identified by storage device 220), and may select the second format (e.g., a default format) from the one or more compatible formats. In some implementations, client device 210 may select a compatible format that results in the greatest compression of the image (e.g., results in a representation of a smaller size than other possible representations in compatible formats) to reduce storage requirements on storage device 220.

As further shown in FIG. 4, process 400 may include providing the second encrypted string to the storage device for storage (block 460). For example, client device 210 may provide the second encrypted string, via network 230, to storage device 220. Storage device 220 may store the second encrypted string. In some implementations, client device 210 may provide a string identifier, that identifies the second encrypted string, to storage device 220, and storage device 220 may store the string identifier in association with the second encrypted string. Client device 210 may use the string identifier to later request the second encrypted string from storage device 220, in some implementations.

Client device 210 may not provide the image to storage device 220, but may instead provide the second encrypted string, that represents the image when processed (e.g., when decrypted, converted, decoded, encoded, etc.), to storage device 220. Furthermore, client device 210 may not provide the key to storage device 220, so that storage device 220 may not decrypt the second encrypted string using the key. In this way, storage device 220 may not be capable of accessing the content of the image (e.g., the image itself), thus providing secure storage of the image.

Although FIG. 4 shows example blocks of process 400, in some implementations, process 400 may include additional blocks, fewer blocks, different blocks, or differently arranged blocks than those shown in FIG. 4. For example, encryption and conversion may occur in a different order than shown. Additionally, or alternatively, two or more of the blocks of process 400 may be performed in parallel.

Figure 5A:
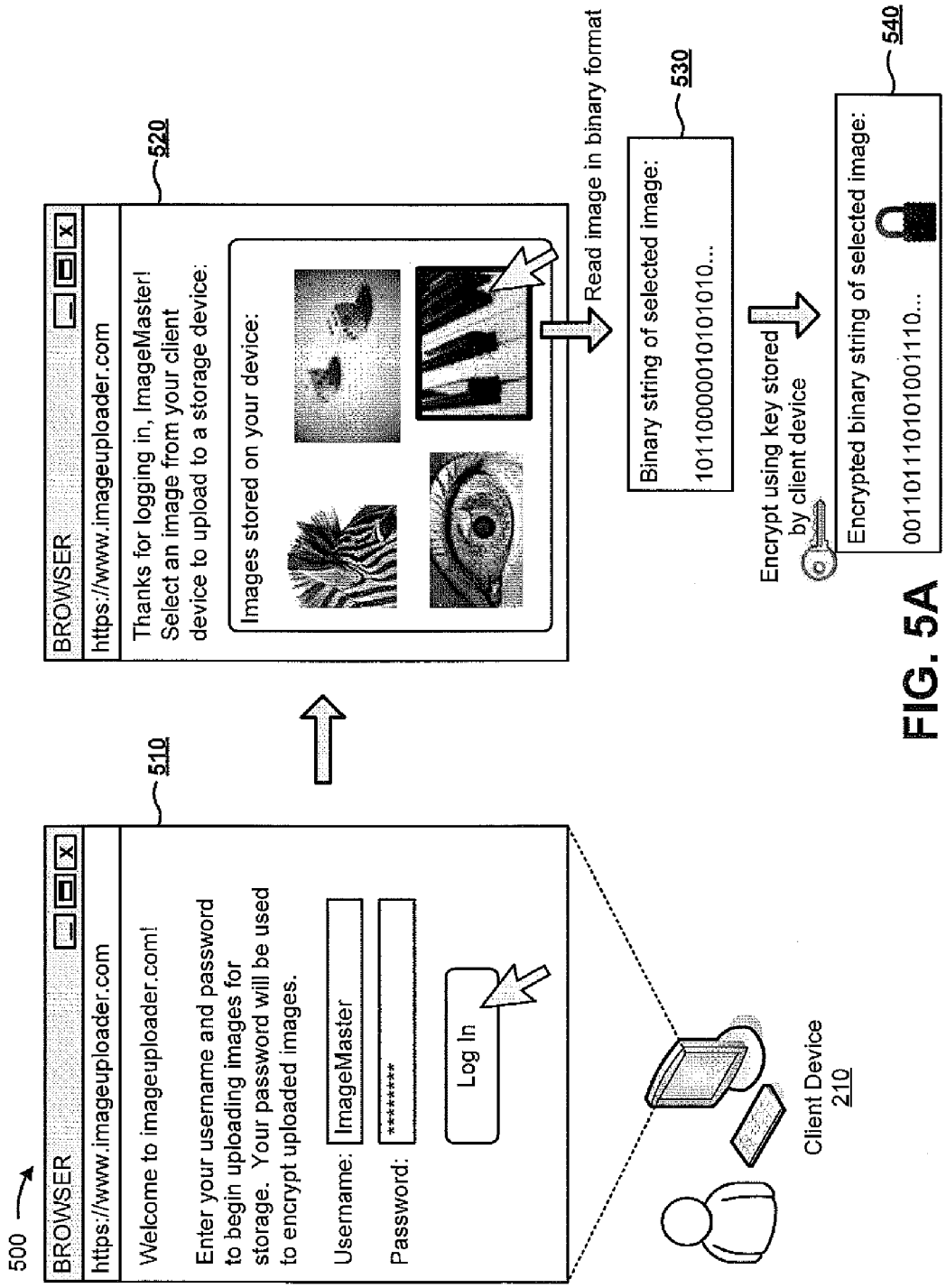
FIGS. 5A and 5B are diagrams of an example implementation relating to the example process shown in FIG. 4.
Figure 5B:
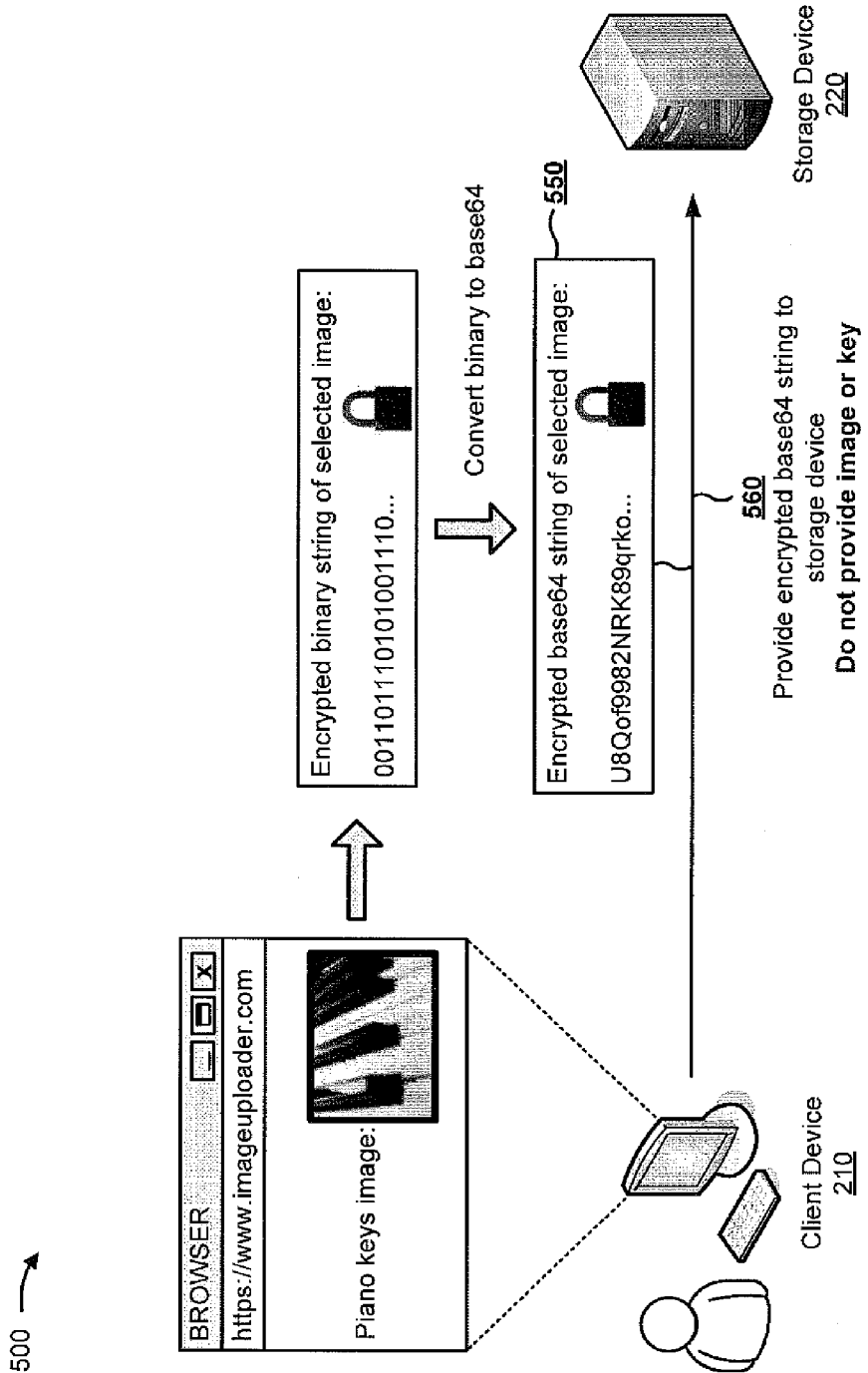

FIGS. 5A and 5B are diagrams of an example implementation relating to example process 400 shown in FIG. 4. FIGS. 5A and 5B show an example of uploading an image, from a client device, for secure storage on a storage device.

As shown in FIG. 5A, and by reference number 510, assume that a user uses a browser on client device 210 to navigate to a web site, shown as www.imageuploader.com. Further assume that the user provides login information, such as a username and password, to log in to the web site and to begin the process of uploading an image to storage device 220. As shown by reference number 520, assume that the user selects an image from multiple images stored on client device 210, shown as an image of piano keys. Based on the user selection of an image to upload to storage device 220, client device 210 (e.g., using a script executed by the browser) converts the image into a binary string, as shown by reference number 530. As shown by reference number 540, assume that client device 210 (e.g., using the browser) determines a key, and encrypts the binary string using the key. Assume that the key is stored by client device 210, such that storage device 220 does not receive, store, or have access to the key.

As shown in FIG. 5B, and by reference number 550, client device 210 converts the encrypted binary string to an encrypted base64 string. As shown by reference number 560, client device 210 provides the encrypted base64 string to storage device 220. Furthermore, client device 210 does not provide the key to storage device 220, so that a person with access to the encrypted base64 string cannot access the image by decrypting the encrypted base64 string using a key stored on storage device 220.

As indicated above, FIGS. 5A and 5B are provided merely as an example. Other examples are possible and may differ from what was described with regard to FIGS. 5A and 5B. For example, client device 210 may use formats other than binary and/or base64 when converting the image to another format for uploading to storage device 220. As another example, client device 210 may determine the key in another manner, such as by prompting the user to input the key and receiving the key based on the user input.

Figure 6:
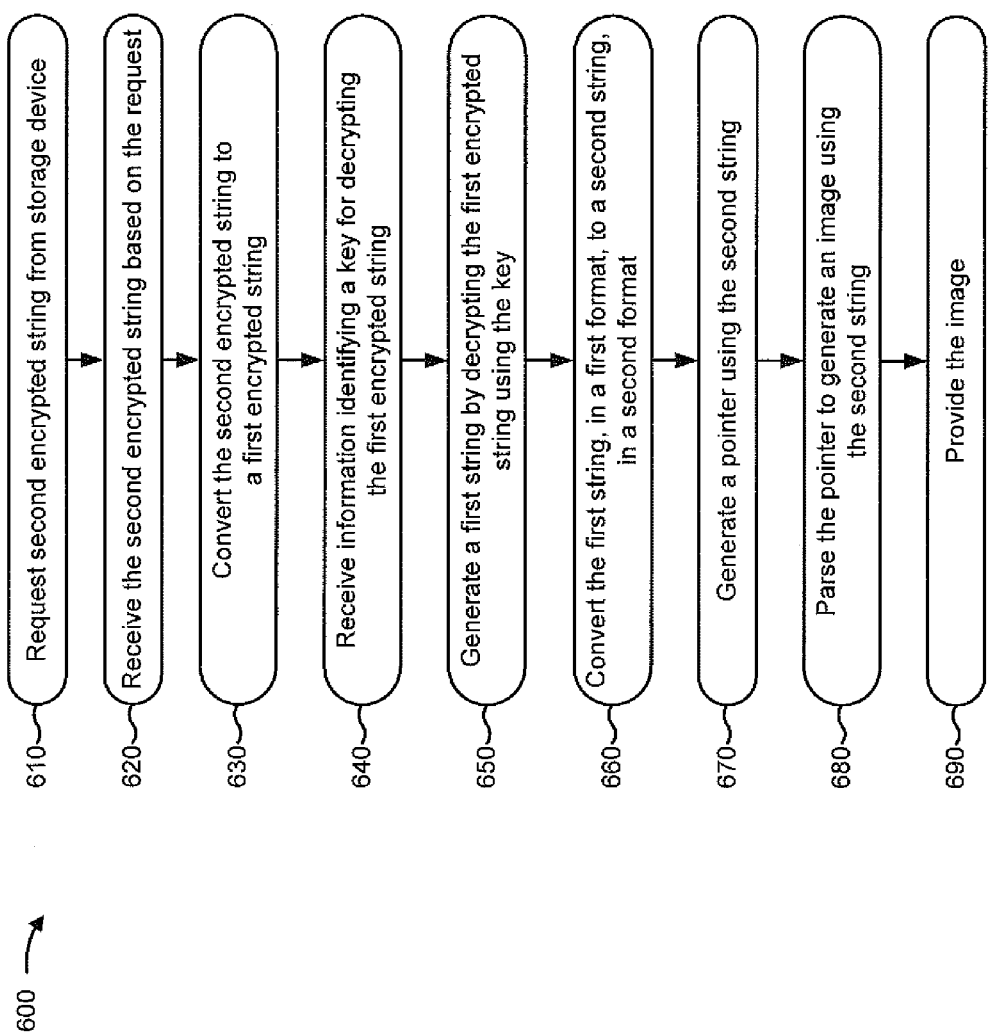
FIG. 6 is a flow chart of an example process for retrieving, for display, an encrypted image or another file from a storage device.

FIG. 6 is a flow chart of an example process 600 for retrieving, for display, an encrypted image or another file from a storage device. In some implementations, one or more process blocks of FIG. 6 may be performed by client device 210. In some implementations, one or more process blocks of FIG. 6 may be performed by another device or a group of devices separate from or including client device 210, such as storage device 220.

As shown in FIG. 6, process 600 may include requesting a second encrypted string from a storage device (block 610). For example, client device 210 may receive a string identifier that identifies the second encrypted string (e.g., described herein in connection with FIG. 4), and may request the second encrypted string from storage device 220 using the string identifier. In some implementations, a user may provide input identifying an image, such as by providing input identifying a name of the image (e.g., a file name), a tag associated with the image, metadata associated with the image, a string identifier associated with the image (e.g., a string identifier that identifies a string associated with the image, such as the second encrypted string), or other information that identifies the image. In some implementations, the user may provide input that identifies multiple images, such as by requesting that all or a subset of all uploaded images be rendered and/or displayed (e.g., via a browser), that images associated with a particular image type, image tag, image category, etc., be rendered and/or displayed (e.g., via the browser), or the like.

Client device 210 may determine information that identifies the second encrypted string based on the user input, in some implementations. For example, client device 210 may use the user input to determine one or more string identifiers that identify one or more second encrypted strings associated with one or more images requested by the user. Using the string identifier(s), client device 210 may determine one or more storage devices 220 storing the second encrypted string(s) and/or may request the one or more second encrypted string(s) from one or more storage devices 220.

As further shown in FIG. 6, process 600 may include receiving the second encrypted string based on the request (block 620). For example, client device 210 may request the second encrypted string from storage device 220 (e.g., using a string identifier), and storage device 220 may process the request and provide the requested second encrypted string to client device 210. The second encrypted string may be in a base64 format, as described herein in connection with FIG. 4. The second encrypted string received by client device 210 from storage device 220 may be the same as the second encrypted string provided to storage device 220 by client device 210, as described herein in connection with FIG. 4.

As further shown in FIG. 6, process 600 may include converting the second encrypted string to a first encrypted string (block 630). For example, client device 210 may convert the second encrypted string, received from storage device 220, to a first encrypted string. The first encrypted string may be in a binary format, as described herein in connection with FIG. 4. For example, client device 210 may convert an encrypted base64 string to an encrypted binary string. The first encrypted string may be the same as the first encrypted string described herein in connection with FIG. 4.

As further shown in FIG. 6, process 600 may include receiving information identifying a key for decrypting the first encrypted string (block 640). For example, client device 210 may determine a key for decrypting the first encrypted string. In some implementations, client device 210 may determine the key based on user input, as described herein in connection with FIG. 4. For example, the user may input the key and/or may input information from which client device 210 may determine the key.

As further shown in FIG. 6, process 600 may include generating a first string by decrypting the first encrypted string using the key (block 650). For example, client device 210 may decrypt the first encrypted string using the key to generate a first string. The first string may be the same as the first string described herein in connection with FIG. 4. For example, the first string may include a binary representation of the image.

As further shown in FIG. 6, process 600 may include converting the first string, in a first format, to a second string, in a second format (block 660), and generating a pointer using the second string (block 670). For example, client device 210 may convert the first string from a first format (e.g., a binary format) to a second format (e.g., a base64 format). The second format may include a base64 representation of an image, in some implementations. In some implementations, client device 210 may convert the first string from a binary string to a text string using binary-to-text encoding.

Client device 210 may use the second string, in the second format, to generate a pointer that includes a representation of the image in the second format. For example, the pointer may include a URI which may include, for example, a pointer to an image source (e.g., <img src=base64 text>). The pointer may identify that the image is a data format representation of the image, such as a base64 representation of the image. The pointer (e.g., a URL) may enable the browser to convert the second string into the image (e.g., to process the second string to generate the image).

As further shown in FIG. 6, process 600 may include parsing the pointer to generate an image using the second string (block 680), and providing the image (block 690). For example, client device 210 may parse the pointer to extract the second string, and may use the second string to generate the image. For example, the second string may include a textual representation of the image from which client device 210 can generate the image. Client device 210 may generate the image and provide the image (e.g., via a browser).

While implementations have been described herein with respect to generating, encrypting, decrypting, and converting representations of images, client device 210 may generate, encrypt, decrypt, and/or convert a representation of another file, such as a video file, a text file, an audio file, or the like. Furthermore, client device 210 may reproduce such a file from a textual representation of the file.

Although FIG. 6 shows example blocks of process 600, in some implementations, process 600 may include additional blocks, fewer blocks, different blocks, or differently arranged blocks than those shown in FIG. 6. For example, encryption and conversion may occur in a different order than shown. Additionally, or alternatively, two or more of the blocks of process 600 may be performed in parallel.

Figure 7A:
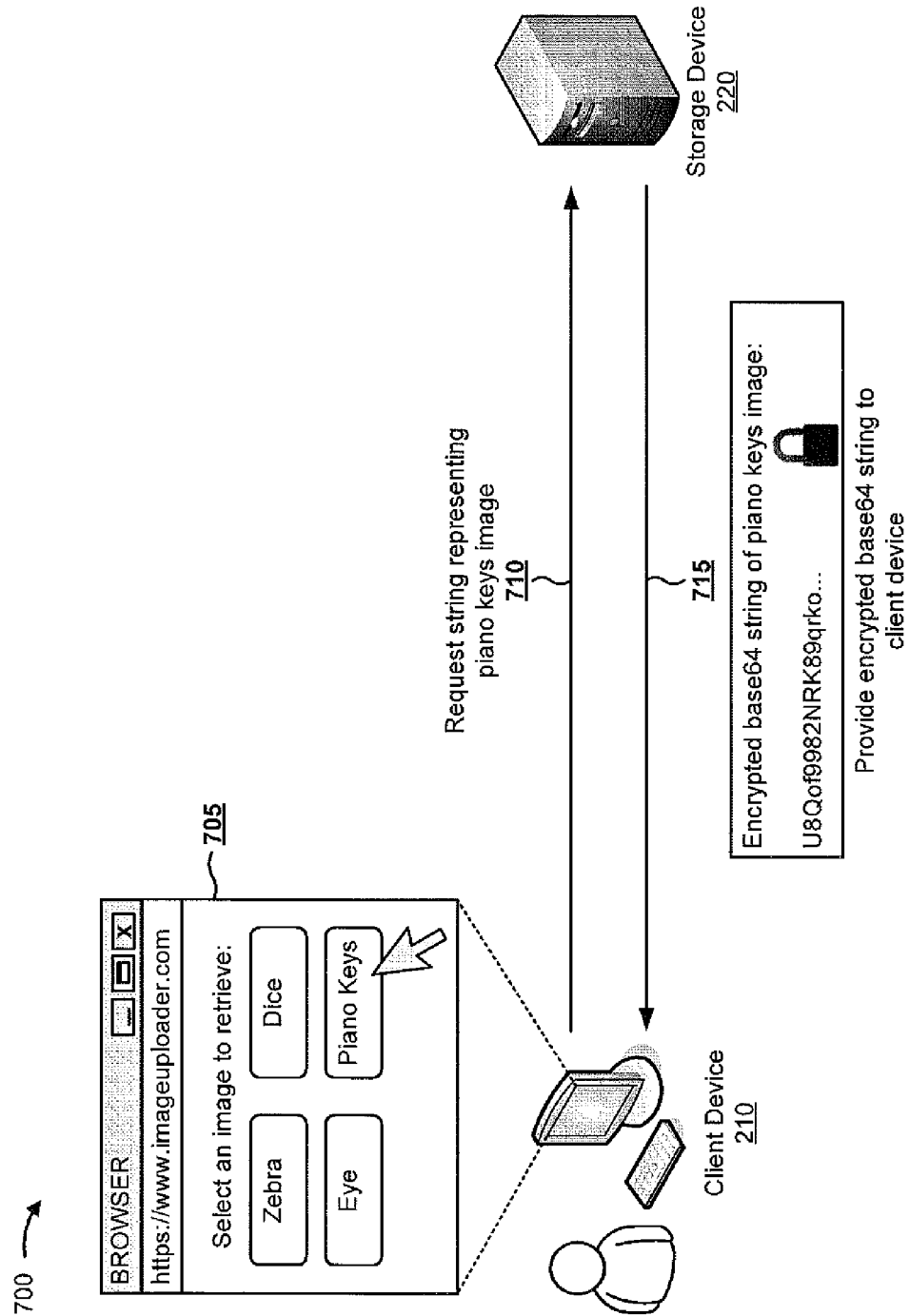
FIGS. 7A-7C are diagrams of an example implementation relating to the example process shown in FIG. 6.
Figure 7B:
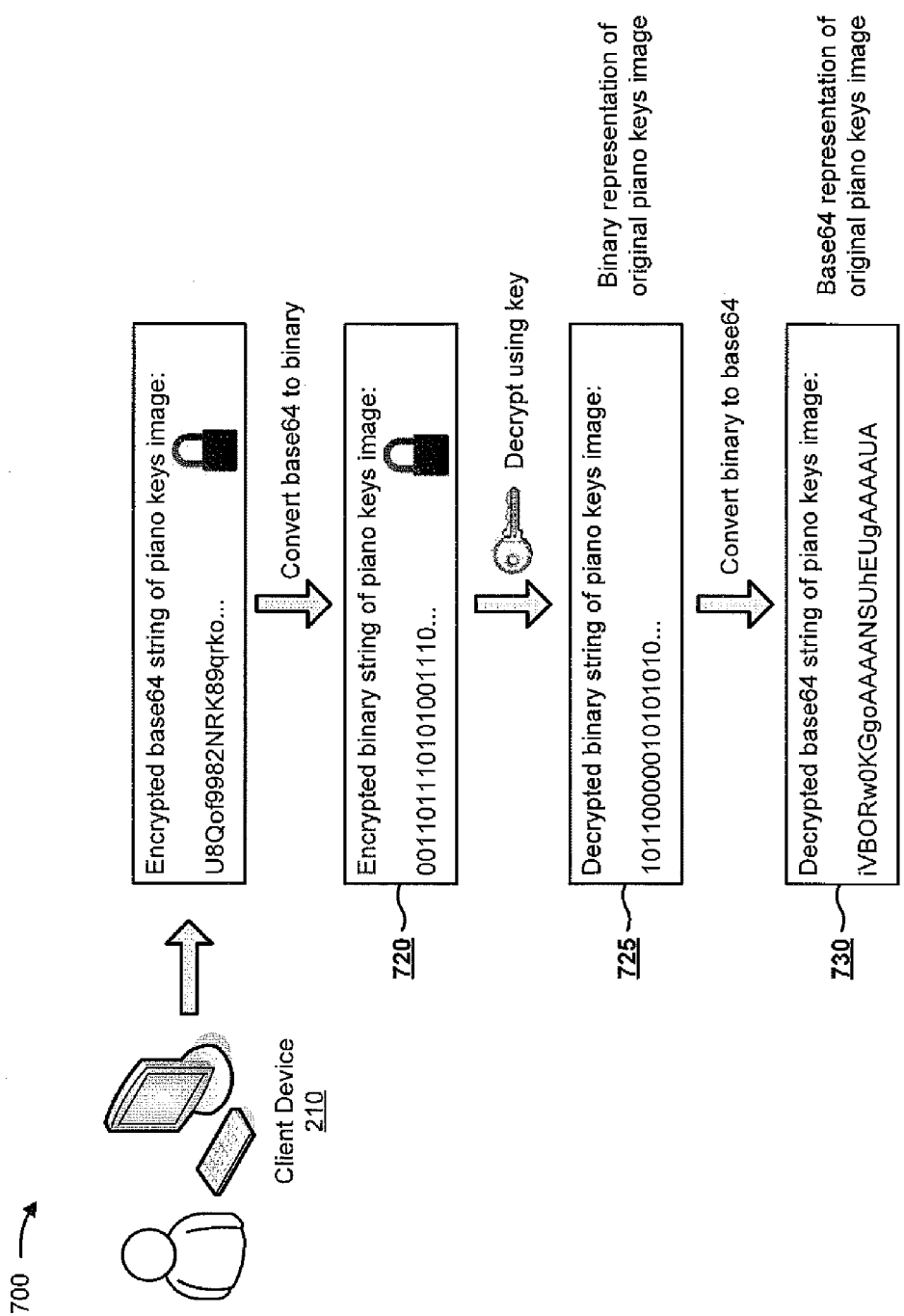
Figure 7C:
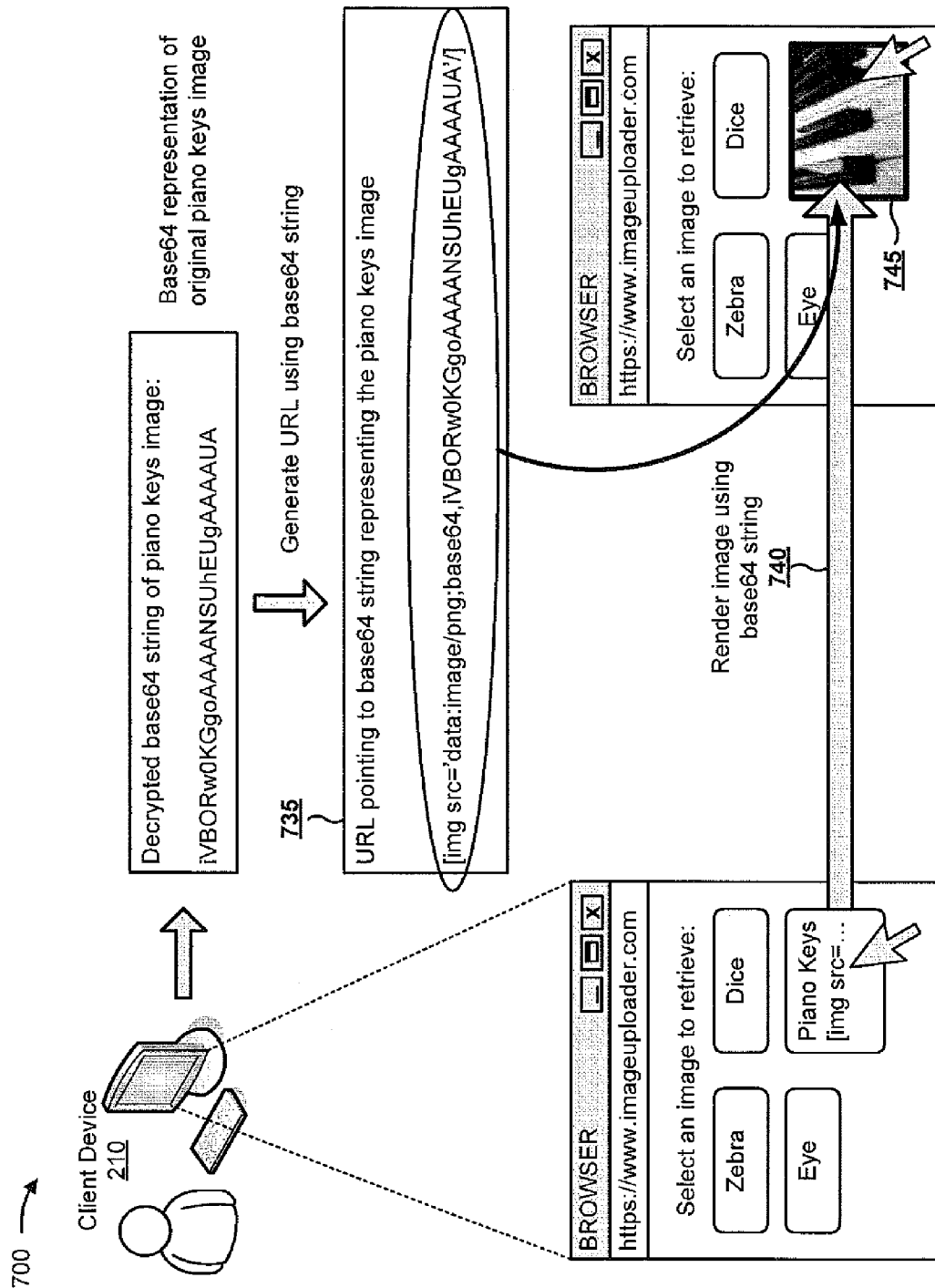

FIGS. 7A-7C are diagrams of an example implementation relating to example process 600 shown in FIG. 6. FIGS. 7A-7C show an example of retrieving an encrypted string from a storage device and converting the encrypted string to an image using a URL.

As shown in FIG. 7A, and by reference number 705, assume that a user of client device 210, using a browser, requests an image to be rendered by client device 210. For example, the user may select a string identifier associated with an image, such as "piano keys," as shown. As shown by reference number 710, client device 210 may use the string identifier to request a string representing the piano keys image from storage device 220. As shown by reference number 715, storage device 220 may use the string identifier to retrieve an encrypted base64 string from memory, and may provide the encrypted base64 string to client device 210.

As shown in FIG. 7B, and by reference number 720, client device 210 may convert the encrypted base64 string to an encrypted binary string. As shown by reference number 725, client device 210 may decrypt the encrypted binary string, using a key associated with the user, to generate a decrypted binary string, which may be a binary representation of the original piano keys image. The key may be input by the user and/or may be stored by client device 210, and may not be provided to or received from storage device 220. As shown by reference number 730, client device 210 may convert the decrypted binary string to a decrypted base64 string, which may be a base64 representation of the original piano keys image.

As shown in FIG. 7C, and by reference number 735, client device 210 may use the decrypted base64 string to generate a URL pointing to the base64 string, which represents the piano keys image. For example, the URL may include an image source identifier (e.g., "img src="), may identify that the image is represented in the URL using a data and/or text format (e.g., "data:image"), may identify a format for the string to be converted to an image (e.g., "base64"), and may include the base64 string representing the image (e.g., "iVBORw0K . . . "). As shown by reference number 740, client device 210 may use the URL and the base64 string to generate the image, and may render the image in the browser, as shown by reference number 745. In this way, client device 210 may utilize a browser to securely render images stored on storage device 220 without providing the image and/or an encryption key to storage device 220.

As indicated above, FIGS. 7A-7C are provided merely as an example. Other examples are possible and may differ from what was described with regard to FIGS. 7A-7C. For example, client device 210 may use formats other than binary and/or base64 to represent the image.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein as receiving information from a device or providing information to a device. These phrases may refer to receiving information directly from a device or providing information directly to a device, without the information being transferred via an intermediary device situated along a communication path between devices. Additionally, or alternatively, these phrases may refer to receiving information, provided by a device, via one or more intermediary devices (e.g., network devices), or providing information to a device via one or more intermediary devices.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   identifying, by a device that includes at least one processor, an image to be encrypted;
   determining, by the device, one or more formats that are compatible with a browser being used to upload the image;
   selecting, by the device, a first format from the one or more formats;
   converting, by the device, the image to a first string in the first format,
      the first string representing the image;
   receiving, by the device, a key for encrypting the first string;
   generating, by the device, a first encrypted string by encrypting the first string using the key;
   converting, by the device, the first encrypted string, in the first format, to a second encrypted string in a second format;
   providing, by the device, the second encrypted string to a storage device without providing the key and without providing the image to the storage device,
      the storage device being unable to recover the image using the second encrypted string;
   receiving, by the device, the second encrypted string from the storage device after providing second encrypted string to the storage device;
   generating, by the device and based on the second encrypted string, a pointer that includes a resource identifier; and
   generating, by the device, the image based on the pointer.

2. The method of claim 1, further comprising:
   requesting the second encrypted string from the storage device,
      where receiving the second encrypted string comprises:
         receiving the second encrypted string from the storage device based on requesting the second encrypted string, and
      where generating the pointer comprises:
         converting the second encrypted string to the first encrypted string;
         decrypting the first encrypted string using the key to determine the first string in the first format; and
         generating the pointer based on the first string.

3. The method of claim 2, where generating the pointer comprises:
   converting the first string to a second string; and
   generating the pointer based on the second string.

4. The method of claim 3, where generating the image comprises;
   parsing the pointer to identify the second string; and
   generating the image based on parsing the pointer.

5. The method of claim 1,
   where generating the image comprises:
      parsing the resource identifier using the browser, and
      rendering the image, using the browser, based on parsing the resource identifier.

6. The method of claim 1,
   where the first format is a binary format, and
   where the second format is a text-based format.

7. The method of claim 6, where the text-based format is a base 64 format.

8. A non-transitory computer-readable medium storing instructions, the instructions comprising:
   one or more instructions that, when executed by one or more processors, cause the one or more processors to:
      receive encrypted text information from a storage device that stores the encrypted text information without storing an image associated with the encrypted text information and without storing a key used to generate the encrypted text information;
      determine one or more formats that are compatible with a browser associated with the encrypted text information;
      select a first format from the one or more formats;
      convert the encrypted text information into encrypted binary information in the first format;
      retrieve the key to be used to decrypt the encrypted binary information,
         the key being inaccessible to the storage device;
      decrypt the encrypted binary information using the key to determine decrypted binary information;
      encode the decrypted binary information into a string of characters;
      generate, based on the string of characters, a pointer that includes a resource identifier;
      parse the pointer;
      generate the image based on parsing the pointer; and
      provide the generated image.

9. The non-transitory computer-readable medium of claim 8,
   where the one or more instructions, when executed by the one or more processors, further cause the one or more processors to:
      embed the pointer in a web page; and
   where the one or more instructions, that cause the one or more processors to provide the generated image, cause the one or more processors to:
      provide the image via the web page.

10. The non-transitory computer-readable medium of claim 8, where the one or more instructions, that cause the one or more processors to encode the decrypted binary information into the string of characters, cause the one or more processors to:
   encode the decrypted binary information into the string of characters that includes a text-based representation of the image.

11. The non-transitory computer-readable medium of claim 8,
where the one or more instructions, when executed by the one or more processors, cause the one or more processors to:
receive information that identifies the image;
convert the image to a binary representation;
determine the key;
encrypt the binary representation using the key to generate the encrypted binary information;
encode the encrypted binary information into the encrypted text information;
provide the encrypted text information to the storage device without providing the key and without providing the image to the storage device; and
request the encrypted text information from the storage device; and
where the one or more instructions, that cause the one or more processors to receive the encrypted text information from the storage device, cause the one or more processors to:
receive the encrypted text information from the storage device based on requesting the encrypted text information from the storage device.

12. The non-transitory computer-readable medium of claim 11, where the one or more instructions, that cause the one or more processors to determine the key, cause the one or more processors to:
determine the key based on user input.

13. The non-transitory computer-readable medium of claim 8, where the encrypted text information includes information encoded in a base64 text format.

14. A device, comprising:
one or more processors to:
receive information identifying a file;
determine one or more formats that are compatible with a browser being used to receive the information identifying the file;
select a first format from the one or more formats;
convert the file to a binary representation of the file in the first format;
generate an encrypted textual representation of the file, using a key, based on the binary representation of the file;
provide the encrypted textual representation of the file to a storage device without providing the key and without providing the file to the storage device;
request the encrypted textual representation of the file from the storage device;
receive the encrypted textual representation of the file from the storage device based on requesting the encrypted textual representation of the file;
generate, by the device and based on the encrypted textual representation of the file, a pointer that includes a resource identifier; and
generate the file based on the pointer.

15. The device of claim 14, where the one or more processors, when generating the pointer, are to:
generate the binary representation of the file based on the key and the encrypted textual representation of the file;
convert the binary representation of the file to a string of characters that represents the file; and
generate the pointer using the string of characters that represents the file.

16. The device of claim 15,
where the one or more processors, when converting the binary representation to the string of characters, are to:
encode the binary representation into a base64 format; and
where the one or more processors, when generating the file, are to:
generate the pointer based on encoding the binary representation into the base64 format.

17. The device of claim 15, where the one or more processors, when generating the binary representation of the file, are to:
convert the encrypted textual representation of the file to an encrypted binary representation of the file;
decrypt the encrypted binary representation of the file using the key; and
generate the binary representation of the file based on decrypting the encrypted binary representation of the file.

18. The device of claim 15, where the one or more processors, when generating the file using the string of characters, are to:
parse the pointer, using the browser, to identify the string of characters;
decode the string of characters; and
generate the file based on decoding the string of characters.

19. The device of claim 14, where the encrypted textual representation includes information encoded in at least one of:
a base64 format;
a base32 format; or
an ASCII format.

20. The device of claim 14, where the file includes at least one of:
an image file;
a text file;
an audio file; or
a video file.

* * * * *